United States Patent
Wagner

(10) Patent No.: US 12,063,005 B2
(45) Date of Patent: Aug. 13, 2024

(54) METHOD OF DETERMINING THE TEMPERATURE OF A MOTOR WINDING OF AN ELECTRIC MOTOR

(71) Applicant: dormakaba Deutschland GmbH, Ennepetal (DE)

(72) Inventor: Martin Wagner, Ennepetal (DE)

(73) Assignee: DORMAKABA DEUTSCHLAND GMBH, Ennepetal (DE)

( * ) Notice: Subject to any disclaimer, the term of this patent is extended or adjusted under 35 U.S.C. 154(b) by 552 days.

(21) Appl. No.: 17/321,775

(22) Filed: May 17, 2021

(65) Prior Publication Data

US 2021/0367549 A1 Nov. 25, 2021

(30) Foreign Application Priority Data

May 20, 2020 (DE) ...................... 10 2020 113 770.2

(51) Int. Cl.
*H02P 29/64* (2016.01)
*G01K 7/18* (2006.01)
*G01K 13/00* (2021.01)
*H02P 23/14* (2006.01)

(52) U.S. Cl.
CPC ............. *H02P 29/64* (2016.02); *G01K 7/183* (2013.01); *G01K 13/00* (2013.01); *H02P 23/14* (2013.01); *B60Y 2400/302* (2013.01); *B60Y 2400/3084* (2013.01)

(58) Field of Classification Search
CPC .......... G01K 7/18; G01K 7/183; G01K 13/00; H02P 23/14; H02P 29/666; B60Y 2400/302; B60Y 2400/3084
See application file for complete search history.

(56) References Cited

U.S. PATENT DOCUMENTS

| | | | |
|---|---|---|---|
| 6,949,945 B2 * | 9/2005 | Klein | G01K 7/183 374/185 |
| 10,938,335 B2 * | 3/2021 | Miller | H02P 29/64 |
| 11,128,253 B1 * | 9/2021 | Colby | H02P 29/66 |
| 2009/0033260 A1 * | 2/2009 | Fernengel | H02P 23/12 318/400.07 |
| 2009/0051311 A1 * | 2/2009 | Lu | H02P 23/14 318/806 |
| 2010/0002744 A1 | 1/2010 | Sheahan | |
| 2010/0156338 A1 * | 6/2010 | Lu | H02P 29/64 361/25 |
| 2012/0206850 A1 | 8/2012 | Takeuchi et al. | |
| 2014/0204973 A1 * | 7/2014 | Kinoshita | G01K 13/00 374/152 |

(Continued)

FOREIGN PATENT DOCUMENTS

| | | |
|---|---|---|
| DE | 102013109773 A1 | 3/2015 |
| FR | 3075514 A1 | 6/2019 |
| WO | 2019121662 A1 | 6/2019 |

*Primary Examiner* — Randy W Gibson
(74) *Attorney, Agent, or Firm* — CANTOR COLBURN LLP

(57) ABSTRACT

A method of determining the temperature of a motor winding of an electric motor, in particular of an electric door drive motor includes determining the electric resistance of the motor winding as a measure for the temperature. The method also includes the steps of providing the electric motor with at least one current sensing resistor and applying an electric voltage to the motor winding.

12 Claims, 1 Drawing Sheet

(56) References Cited

U.S. PATENT DOCUMENTS

| | | | |
|---|---|---|---|
| 2016/0156301 A1* | 6/2016 | Yato | G01K 7/00 |
| | | | 374/152 |
| 2017/0179869 A1* | 6/2017 | Sekiguchi | H02P 23/14 |
| 2018/0131302 A1* | 5/2018 | Frampton | H02P 9/04 |
| 2019/0229872 A1* | 7/2019 | Gerszberg | H04W 72/0453 |
| 2020/0014326 A1 | 1/2020 | Miller | |

* cited by examiner

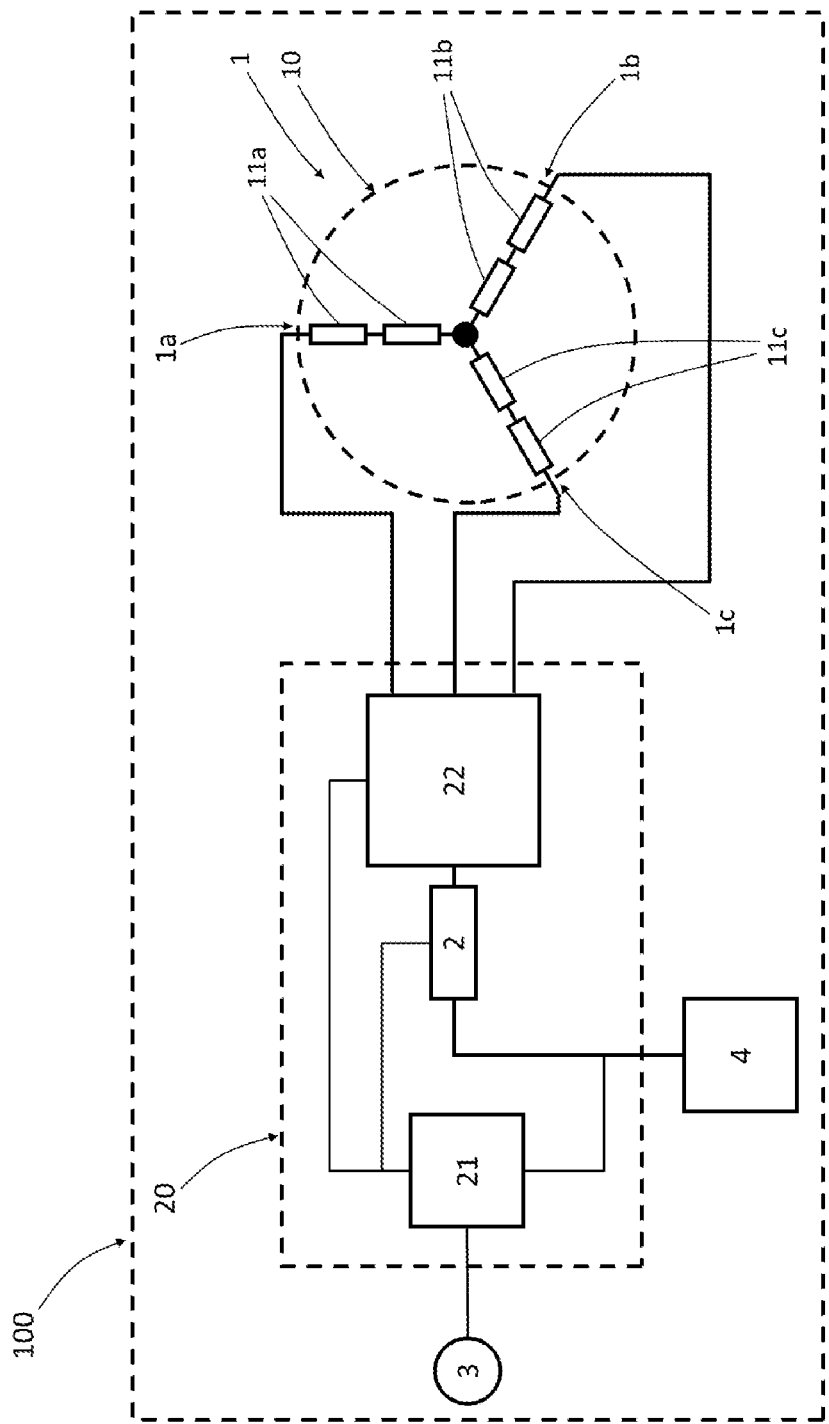

METHOD OF DETERMINING THE
TEMPERATURE OF A MOTOR WINDING OF
AN ELECTRIC MOTOR

CROSS-REFERENCE TO RELATED APPLICATIONS

This application claims priority to European Patent Application No. 102020113770.2, filed on May 20, 2020, the contents of which are hereby incorporated by reference in their entirety.

TECHNICAL FIELD

The present disclosure relates to a method of determining the temperature of a motor winding of an electric motor, in particular of an electric door drive motor.

BACKGROUND

When operating electric motors, the current flowing through the motor windings results in warming the motor windings, in particular due to ohmic losses. With the intention to prevent the electric motor from overheating and potential damage resulting therefrom, it is common to perform energy management of the electric motor depending on the temperature thereof. In case of imminent exceeding a critical temperature limit, such energy management applies temperature-reducing measures. In case of an electric door drive motor, i.e. an electric motor of the drive of an automatic door system, such temperature-reducing measures can relate to reducing the travelling speed of the door leaves or in extending the hold-open time of the door, for example.

In the state-of-the-art it is known to determine the temperature of the motor windings of electric motors by suitably disposed temperature sensors. The inherent latency time between warming of the motor winding due to energizing and detecting said warming at the location of the temperature sensor is disadvantageous when using such temperature sensors. Based on said latency time, it is not possible to operate the electric motor to the capacity limit thereof, rather, it is necessary to keep a certain capacity reserve for preventing the motor winding from overcritical warming. Moreover, equipping an electric motor with temperature sensors is disadvantageously linked to increasing the structural space thereof, and generally, said additional sensor system increases the complexity and the fault susceptibility of the electric motor.

SUMMARY

Therefore, the present disclosure proposes a method of determining the temperature of a motor winding of an electric motor, which in particular manages without using separate temperature sensors.

This is achieved based on a method according to claim 1 in conjunction with the characterizing features. Advantageous further developments of the disclosure are indicated in the dependent claims.

The disclosure includes the technical teaching of determining the electrical resistance of the motor winding as a measure for the temperature.

In this case, the disclosure is based on the idea of determining the temperature directly in the motor winding.

Due to the distinct temperature dependency, the electrical resistance is a suitable measure for this purpose, which moreover is metrologically easily accessible. In particular, the electrical resistance changes so to say instantly with the temperature of the motor winding, so that energy management based on the inventive method does not have to consider latency time of the temperature determination. Usually, when operating an electric motor, a well known electric voltage is applied to the motor winding and as a consequence, determining the flowing electric current is suitable for determining the electrical resistance of the motor winding.

Preferably, the electric motor is provided with at least one current sensing resistor, wherein determining the electrical resistance of the motor winding is performed by means of measuring the electric current flowing through the current sensing resistor.

In detail in an advantage embodiment, the inventive method comprises at least the following steps:
    providing the electric motor with at least one current sensing resistor, wherein the current sensing resistor is connected in series with the motor winding,
    applying an electric voltage to the motor winding and determining the amperage of the resulting electric current by means of measuring a voltage drop over the current sensing resistor,
    determining the electrical resistance of the motor winding from the quotient of voltage to amperage, and
    determining the temperature of the motor winding by means of associating the resistance to tabulated pairs of values of resistance/temperature.

Therefore, the method is based on determining the amperage of the electric current, which flows when applying a known electric voltage to the motor winding, and on subsequent calculation of the sought electrical resistance of the motor winding according to Ohm's law. For this purpose, the voltage drop is measured over a current sensing resistor, wherein the current sensing resistor is connected in series with the motor winding so that the same current flows through the current sensing resistor and the motor winding. Determining the temperature of the motor winding from the electrical resistance is realized by means of associating to tabulated pairs of values resistance/temperature, which in particular have been collected ahead of time, preferably within the context of a factory reference measurement.

Thus, according to the disclosure, determining the temperature of the motor winding succeeds without using separate temperature sensors, it is rather performed by just incorporating an additional current sensing resistor in the circuit of the electric motor.

Preferably, the tabulated pairs of values resistance/temperature are taken from a reference measurement, wherein, for the reference measurement, the electric motor is provided with at least one temperature sensor disposed in the area of the motor winding and is disposed in a climate chamber, and wherein the reference measurement comprises performing the following steps several times:
    adjusting an ambient temperature in the climate chamber,
    measuring the temperature of the motor winding by means of the temperature sensor,
    applying an electric test voltage to the motor winding and determining the amperage of the resulting electric current by means of measuring the voltage drop over the current sensing resistor,
    determining the electrical resistance of the motor winding from the quotient of test voltage to amperage, and
    forming a corresponding pair of values resistance/temperature.

Such a reference measurement is to be performed just once in the factory and the obtained pairs of values resistance/temperature can be stored in particular in a storage medium associated to the electric motor. In this case for example, with a plurality of produced identical electric motors, it is not necessary to have each single motor undergo the reference measurement, rather it can be sufficient to obtain the pair of values resistance/temperature from only one representative exemplary motor.

Furthermore, the disclosure relates to a method of controlling an electric motor, in particular an electric door drive motor, wherein the electric motor comprises at least one motor winding, and wherein the method is directed to an energy management of the electric motor depending on the temperature of the motor winding. According to the disclosure, determining the temperature of the motor winding is performed according to a method of one of the aforementioned embodiments. The energy management protects the electric motor during operation from overheating and thus from potential damage, wherein on account of the precision of the inventive method of determining the motor winding temperature, the control can operate the electric motor up to the power limit.

In a preferred embodiment, the electric motor is provided as a brushless, permanently excited direct current motor with three motor phases, wherein each motor phase comprises one motor winding, and wherein determining the temperature for all motor phases is performed together or individually for each motor phase.

For example, determining the temperature of a door drive motor is performed in an end state, in which the door leaf is at rest and pushed against a mechanical abutment. The necessary energizing of the electric motor for this purpose can be measured by means of the current sensing resistor and thus a temperature can be determined averaged over all motor windings. However, in this case, depending of the position of the rotor, the individual motor phases are differently energized, so a corresponding inaccuracy needs to be considered when determining the temperature.

In an advantageous embodiment, determining the temperature is performed sequentially for each motor phase individually, wherein the test voltage per motor phase is applied as a periodic pulse-width-modulated signal, wherein the signal has a pulse-pause-ratio of 1% to 20%. In case of non-uniform warming of the electric motor, such individual temperature determination offers the possibility of detecting in each single motor phase when a critical temperature limit is reached, respectively for preventing this from happening by means of the energy management. In particular in this case, a damaged motor phase can be identified. Moreover, comparing the determined temperature values of the individual phases allows for performing a plausibility check.

When energizing the motor phases for the purpose of temperature determination, it should be insured that, when applying a test voltage, the rotor of the electric motor and, for example, the thereby driven door, are not entrained into movement, if possible. For this purpose should be selected an as short as possible a pulse-pause-ratio of the test signal, wherein the voltage impulses must be sufficiently long for guaranteeing reliable current measurement at the current sensing resistor. In an electric door drive motor, the inertia of the associated door leaf must be overcome for initializing the movement, and in practical application a pulse-pause-ratio was identified in the range of 1% to 20% as a suitable range of values, which, on the one hand, guarantees reliable current measurement and, on the other hand, does not result in significantly moving the door leaf.

In a further embodiment of the inventive method, determining the temperature is performed together for all motor phases, wherein the angle of commutation of the electric motor is set such that the rotor of the electric motor is not entrained into rotation. In this case, the angle of commutation denotes the angular position of the rotor within a magnetic period of the electric motor. The advantage of said embodiment is that, during the test of the motor winding temperature, there is no rotor rotation so that when applied in a door drive motor, no jerking or other movement of the door leaf is to be anticipated. A temperature is determined averaged over all motor phases.

Advantageous further developments of the method are indicated in the dependent method claims, the description and in the FIGURES. Furthermore, the advantage is achieved by providing a door drive according to the independent claim 10. Advantageous further developments of the door drive are also indicated in the description and in the FIGURES. In this case, features and details, described in conjunction with the inventive method, are also valid in conjunction with the inventive door drive and vice versa. In this case, the features mentioned in the description and in the claims can be essential to the disclosure each individually or in combination. In particular a door drive is claimed, which allows for performing the inventive method, in particular the method according to any of the claims 1 to 9.

Moreover thereby, the disclosure relates to a door drive, comprising at least one electric motor with at least one motor winding and a control unit for controlling the electric motor. According to the disclosure, the control unit includes at least one current sensing resistor, which is connected in series with the motor winding, wherein the control unit is adapted for measuring a voltage drop over the current sensing resistor and for performing a control of the electric motor according to a method according to any of the aforementioned embodiments.

In particular, the electric motor is formed as a brush-less permanently excited direct current motor with two motor-halves, wherein each motor-half comprises three motor phases with one respective motor winding, and wherein the control unit comprises two current sensing resistors, which are connected in series with one respective motor-half. Such a formation with two independent motor-halves is to be considered as a redundant safety precaution.

Preferably, the door drive comprises an ambient temperature sensor, with which can be determined additionally the ambient temperature, when determining the temperature of the motor winding. Such measurement of the ambient temperature can be necessary during energy management for separating an extrinsic part, for example sun radiation, from the determined temperature of the motor winding.

DETAILED DESCRIPTION OF THE FIGURE

Further measures enhancing the disclosure are illustrated in the following in detail in conjunction with the description of a preferred exemplary embodiment of the disclosure based on the FIGURE.

The FIGURE shows a diagrammatic illustration of an inventive door drive 100, comprising the electric motor 1 with three motor phases 1*a*, 1*b*, 1*c*, as well as the control unit 20 for controlling the electric motor 1.

The electric motor 1 is formed as a brush-less permanently excited direct current motor, wherein the illustrated motor phases 1*a*, 1*b*, 1*c* with the respective motor windings 11*a*, 11*b*, 11*c* represent the stator, and the herein non-illustrated rotor is equipped with permanent magnets. In particular, the electric motor 1 can include two redundant motor-halves, wherein herein only one motor-half is illustrated for the sake of clarity. Each one of the three motor phases 1a, 1b, 1c has two coils, together forming one respective motor winding 11a, 11b, 11c. The three motor phases 1a, 1b, 1c are connected to a star connection at a central star point and are chargeable with voltage via the control unit 20.

The control unit 20 comprises the controller 21, the current sensing resistor 2 and the final stage 22. The current sensing resistor 2 is connected between the voltage source 4 and the final stage 22 and thus in series with all motor windings 11a, 11b, 11c.

The controller 21 is formed for measuring the voltage, which drops over the current sensing resistor 2, and, based thereon, for calculating the amperage and the electric resistance of the respectively energized motor windings 11a, 11b, 11c. At a specified voltage U and amperage I detected by the current sensing resistor 2, applying Ohm's law, the overall resistance of the electric motor 1 to $R_{total}=U/I$. In this case, the motor windings 11a, 11b, 11c make the biggest contribution to the overall resistance and in particular to the dependency thereof from the motor winding temperature T, so that the sought resistance of the motor windings 11a, 11b, 11c is determined $R_{winding}(T)=R_{total}(T)-R_{rest}$. In this case, the already known constant $R_{rest}$ sums up all remaining contributions, such as supply lines, connectors and power electronics and for simplifying is used as temperature independent, for example.

According to the disclosure, the such determined resistance of the respectively inspected motor winding 11a, 11b, 11c then, for the temperature determination, is compared to already known pairs of values resistance/temperature, which, for example, are stored in a storage unit of the controller 21. The thus determined temperature of the motor windings 11a, 11b, 11c serves for the inventive control method of performing the energy management of the electric motor 1 when operating the door drive 100.

Depending on the embodiment of the inventive method, determining the motor winding temperature can be realized together for all motor phases 1a, 1b, 1c, i.e. averaged, or performed sequentially for each motor phase 1a, 1b, 1c individually.

In this case preferably, an averaging measurement is performed in an end state of the door drive 100, in which the electric motor 1 is energized for pressing the associated door leaf against a mechanical terminal abutment.

Consequently, in this case, no separate test voltage is applied, but as the operating modus is being energized, the inventive temperature determination is performed. This has the advantage of not having to carry out any separate test sequences for the temperature determination, during which the associated door installation would have to be brought to a corresponding test mode and could not be opened or closed, for example. Disadvantageously however, the explained procedure bears a larger inaccuracy, because depending on the position of the rotor in the end state of the door drive 100, the individual motor phases 1a, 1b, 1c could be differently energized, for example, one of the motor phases 1a, 1b, 1c is completely currentless, so that non-uniform warming of the motor phases 1a, 1b, 1c could be given.

As an alternative, the motor phases 1a, 1b, 1c are energized in sequence in pairs by applying a test voltage, for example, a test current flows into motor phase 1a and exits from motor phase 1b, while motor phase 1c remains currentless, and the resistance of each individual motor phase 1a, 1b, 1c is calculated from the three obtained resistances by linear algebra. In this case, measuring the different combinations can be done also timely offset distributed over several travel cycles of the door drive 100, for example, with intermediate door opening or door closing procedures, in order to only interrupt as briefly as possible the normal operating mode of the door installation. With the intention to prevent, if possible, the electric motor 1 from unwanted starting, for measuring, test voltages are applied to the motor phases 1a, 1b, 1c in form of periodic pulse-width-modulated signals having a low pulse-pause-ratio of 1% to 20%.

In a further embodiment of the inventive method, when determining the motor winding temperature, the phase position of the test voltage signals applied to the motor phases 1a, 1b, 1c is controlled such that it results in such a commutation angle of the electric motor 1, that the rotor is not entrained into rotation. Thus, the control unit 20 controlling the motor phases 1a, 1b, 1c must be configured such that no significant torque acts on the rotor, which is given at a commutation angle of 0° and 180°. The advantage of said measuring principle is that the door drive 100 is not excited for any movement so that determining the temperature can be realized completely without users of the associated door installation noticing anything.

Furthermore, the door drive 100 illustrated in the FIGURE, comprises the ambient temperature sensor 3, by means of which the ambient temperature can be determined in the respective installation situation of the door drive 100. For example, direct sun radiation can result in a higher basic temperature of the electric motor 1, which, as an offset, is introduced in the inventive determination of the motor winding temperature, and likewise has to be considered during the energy management of the electric motor 1. Moreover, the temperature, the ambient temperature sensor 3 determines, can serve as a reference value, to which a motor winding temperature can be compared, which was determined in the inventive method in the "cold" condition of the electric motor 1, i.e. for example, after a period of time of several hours elapsed since last actuating the door drive 100.

The disclosure in the embodiment thereof is not limited to the aforementioned preferred exemplary embodiment.

Rather a number of variants are conceivable, which use the illustrated solution also in basically different embodiments. All features and/or advantages including the constructional details, spatial dispositions and process steps, which result from the claims, the description or the drawings, may be essential to the disclosure, both by themselves and in their most various combinations.

The invention claimed is:

1. A door drive for moving a door leaf of an automatic door system, the door drive comprising at least one electric motor having at least one motor winding and a control unit for controlling the electric motor, wherein the control unit includes at least one current measuring resistor connected in series with the motor winding, the control unit being arranged to measure a voltage drop across the current measuring resistor and controlling the electric motor in accordance with a method for controlling the electric motor, the method being aimed at energy management of the electric motor as a function of the temperature of the motor winding, the determination of the temperature of the motor winding being carried out in accordance with a method for determining the temperature of the motor winding, the electric resistance of the motor winding being determined as a measure of the temperature.

2. The door drive of claim 1, wherein the electric motor is provided with at least one current sensing resistor, wherein determining the electrical resistance of the motor winding is performed by measuring the electric current flowing through the current sensing resistor.

3. The door drive according to claim 1, including at least the following steps:
providing the electric motor with at least one current sensing resistor, wherein the current sensing resistor is connected in series with the motor winding,
applying an electric voltage to the motor winding and determining the amperage of the resulting electric current by means of measuring a voltage drop over the current sensing resistor,
determining the electrical resistance of the motor winding from the quotient of voltage to amperage, and
determining the temperature of the motor winding by means of associating the resistance to tabulated pairs of values of resistance/temperature.

4. The door drive according to claim 3, wherein the tabulated pairs of values resistance/temperature are solicited from a factory reference measurement.

5. The door drive according to claim 1, wherein, for the reference measurement, the electric motor is provided with at least one temperature sensor disposed in the area of the motor winding, and is disposed in a climate chamber, and wherein the reference measurement comprises performing several times the following steps:
adjusting an ambient temperature in the climate chamber,
measuring the temperature of the motor winding by means of the temperature sensor,
applying an electric test voltage to the motor winding and determining the amperage of the resulting electric current by measuring a voltage drop over the current sensing resistor,
determining the electrical resistance of the motor winding from the quotient of test voltage to amperage, and
forming a corresponding pair of values resistance/temperature.

6. A method of controlling an electric motor, wherein the electric motor comprises at least one motor winding, and wherein the method is directed to an energy management of the electric motor depending on the temperature of the motor winding, wherein determining the temperature of the motor winding is performed according to the door drive of claim 1.

7. The method according to claim 6, wherein the electric motor is provided as a brush-less permanently excited direct current motor with three motor phases, wherein each motor phase comprises a motor winding, and wherein determining the temperature is performed for all motor phases together or individually for each motor phase.

8. The method according to claim 6, wherein determining the temperature is performed individually in sequence for each motor phase, wherein a test voltage is applied as a periodic pulse-width-modulated signal per each motor phase, wherein the signal has a pulse-pause-ratio of 1% to 20%.

9. The method according to claim 6, wherein determining the temperature is performed together for all motor phases, wherein the commutation angle of the electric motor is adjusted such that the rotor of the electric motor is not entrained into rotation.

10. The door drive according to claim 1, wherein the electric motor is formed as a brush-less permanently excited direct current motor with two motor-halves, wherein each motor-half comprises three motor phases with one respective motor winding, and wherein the control unit comprises two current sensing resistors connected in series with one respective motor-half.

11. The door drive according to claim 1, wherein the door drive comprises an ambient temperature sensor configured to determine the ambient temperature when determining the temperature of the motor winding.

12. An automatic door system with a door leaf, wherein the door drive according to claim 1 is used in the automatic door system for moving the door leaf.

* * * * *